US011836739B2

(12) United States Patent
Pandya et al.

(10) Patent No.: US 11,836,739 B2
(45) Date of Patent: Dec. 5, 2023

(54) ADAPTIVE TRANSACTION PROCESSING SYSTEM

(71) Applicant: Giant Oak, Inc., Arlington, VA (US)

(72) Inventors: Harsh Pandya, Arlington, VA (US); Jacob Shapiro, Arlington, VA (US); Gary Shiffman, Arlington, VA (US)

(73) Assignee: CONSILIENT, INC., Arlington, VA (US)

( * ) Notice: Subject to any disclaimer, the term of this patent is extended or adjusted under 35 U.S.C. 154(b) by 182 days.

(21) Appl. No.: 16/210,942

(22) Filed: Dec. 5, 2018

(65) Prior Publication Data

US 2020/0184487 A1 Jun. 11, 2020

(51) Int. Cl.
*G06Q 30/018* (2023.01)
*G06N 20/00* (2019.01)
*H04L 9/40* (2022.01)

(52) U.S. Cl.
CPC ......... *G06Q 30/0185* (2013.01); *G06N 20/00* (2019.01); *H04L 63/30* (2013.01)

(58) Field of Classification Search
CPC .... G06Q 30/0185; G06Q 40/12; G06N 20/00; H04L 63/30
See application file for complete search history.

(56) References Cited

U.S. PATENT DOCUMENTS

| 7,668,769 | B2 * | 2/2010 | Baker | G06Q 20/10 |
| | | | | 705/42 |
| 10,789,643 | B1 * | 9/2020 | Chang | H04L 63/168 |
| 2010/0106611 | A1 * | 4/2010 | Paulsen | G06Q 20/102 |
| | | | | 705/26.1 |
| 2016/0078353 | A1 * | 3/2016 | Shen | G06Q 10/06 |
| | | | | 706/46 |
| 2016/0253672 | A1 * | 9/2016 | Hunter | G06Q 40/06 |
| | | | | 705/39 |

(Continued)

OTHER PUBLICATIONS

PCT International Search Report and Written Opinion in International Application No. PCT/US19/64625, dated Feb. 25, 2020, 8 pages.

(Continued)

*Primary Examiner* — Florian M Zeender
*Assistant Examiner* — Vanessa Deligi
(74) *Attorney, Agent, or Firm* — Fish & Richardson P.C.

(57) ABSTRACT

Systems and techniques are described for applying machine learning techniques to dynamically identify potentially anomalous activity of entities. In some implementations, peer group data is obtained. The peer group data indicates multiple entities classified as belonging to a particular peer group, and a set of attributes associated with the multiple entities. Transaction data for the multiple entities is obtained from one or more data sources. One or more transaction models are selected. The transaction models that are each trained to apply a particular set of evidence factors corresponding to the set of attributes associated with the multiple entities, and identify transaction patterns representing potentially anomalous activity. The transaction data is processed using the one or more transaction models to identify potentially anomalous activity within the transaction data for the multiple entities. A prioritization indicator is computed for each entity included in the multiple entities.

23 Claims, 8 Drawing Sheets

(56) References Cited

U.S. PATENT DOCUMENTS

| | | | |
|---|---|---|---|
| 2016/0364794 A1 | 12/2016 | Chari et al. | |
| 2017/0270534 A1* | 9/2017 | Zoldi | G06Q 20/4016 |
| 2019/0034932 A1* | 1/2019 | Sadaghiani | G06F 16/285 |
| 2019/0378050 A1* | 12/2019 | Edkin | G06N 20/20 |
| 2020/0104849 A1* | 4/2020 | Cai | G06Q 40/00 |
| 2020/0195670 A1* | 6/2020 | Deardorff | H04L 41/142 |

OTHER PUBLICATIONS

International Preliminary Report on Patentability in International Appln. No. PCT/US2019/064625, dated Jun. 17, 2021, 7 pages.

* cited by examiner

ADAPTIVE TRANSACTION PROCESSING SYSTEM

TECHNICAL FIELD

This specification generally describes technology related to machine learning, and more particularly, to technology related to transaction processing systems.

BACKGROUND

Transaction processing software is often used by regulated entities to prevent or report illicit activities to regulatory bodies. Examples of such software include transaction monitoring systems, currency transaction reporting systems, customer identity management systems, and compliance management systems.

Transaction monitoring software generally focus on identification of suspicious patterns of transactions that may result in the filing of Suspicious Activity Reports (SARs) or Suspicious Transaction Reports (STRs). Identification of suspicious (as opposed to normal) transactions is often part of know-your-customer (KYC) requirements imposed on regulated entities. Currency Transaction Reporting (CTR) generally deal with large cash transaction reporting requirements, e.g., $10,000 and over in the U.S. Customer identity management systems check various negative lists (such as the Office of Foreign Asset Control) and represent an initial and ongoing part of KYC requirements. Electronic verification can also check against other databases to provide positive confirmation of an identification.

Compliance software often helps financial institutions comply with regulatory requirements, e.g., anti-money laundering (AML) regulations. Such software can also be used to retain the necessary evidence of compliance and deliver and record appropriate training of relevant staff. In some instances, compliance software can be used to produce audit trails of compliance officers activities in particular pertaining to the handling of alerts raised against customer activity.

SUMMARY

This disclosure describes systems and techniques that are capable of applying machine learning techniques to dynamically identify potentially anomalous activity of entities. The potentially anomalous activity can represent, for example, suspicious activity performed by an associated entity, a deviation from regular transactional activity, or some other type of activity that may be of interest to a regulating entity.

The system described herein can identify potentially anomalous activity in a manner that addresses limitations of some transaction processing systems. The system can classify entities as belonging to distinct peer groups that each share a set of attributes, such as a business classification, an average transaction value, types of reoccurring transactions, and a number of employees, among others. As an example, a peer group can include entities that are money service businesses that operate in Washington, D.C.

The system can also apply adaptive transaction processing techniques using pattern recognition to evaluate the normalcy of transaction data and thereby identify potentially anomalous activity associated with entities within a peer group. For example, potentially anomalous activity can be transactions or activity that are not considered to be normal for entities included in the same particular peer group. Because the system evaluates transaction data with respect to the shared attributes of a peer group, the identification of potentially anomalous activity is contextualized to the types of normal activity associated with the peer group. These techniques enable the system to evaluate transaction data in a more dynamic fashion so that different types of behaviors are factored into transaction data evaluation. Compared to transaction evaluation rules that apply static criteria to identify anomalous activity, the dynamic transaction processing techniques described herein allow a system to improve performance by, for example, reducing the likelihood of false positive detection and improving the likelihood of identifying activity that may otherwise appear normal given a set of static criteria.

The system can also improve the likelihood that a regulator will accurately identify transaction anomalies that require further review. To accomplish this, the system can compute a "prioritization indicator" that represents a relative assessment of anomalous activity. For example, the system can compute and assign a prioritization score to each entity belonging to a peer group so that entities that are assigned the highest score values are entities that are identified as having the greatest amount of potentially anomalous activity. In other examples, the prioritization indicator is not strictly a score, but can be a label that represents how anomalous an entity is compared to the other entities of the same peer group, e.g., "HIGH," "MEDIUM," or "LOW" labels.

Additionally, the architecture of the system provides various technological improvements to techniques used by transaction processing computing systems to compute transaction metrics. The techniques described herein enable the system to compute transaction metrics with greater precision and have greater utility to an end-user compared to transaction metrics computed using static transaction processing rules. For example, the system can apply trained transaction models to identify data patterns within transaction data and reduce the amount of transaction information that is output to end-users. This ensures that only the most relevant transaction information, i.e., transaction information that is most likely to represent potentially anomalous activity, is provided to end-users, thereby improving the transaction processing workflows used by end-users. For instance, the system can use a peer grouping model to classify entities within certain peer groups based on attributes shared between the entities of the same peer group. When processing transaction data for a certain entity to identify potentially anomalous activity, the system can use the peer group classification to select only the transaction models that are relevant to the attributes associated with the peer group and avoid processing the transaction data using transaction models that are not relevant. This selective transaction modeling technique can be used to reduce the amount of information that is provided for output to an end-user.

As an example, a restaurant can be assigned to a food services peer group that includes other restaurants in a geographic region. In processing the transaction data for the restaurant, the system can apply a money laundering transaction model that is trained to identify potentially anomalous activity at restaurants that are likely to represent money laundering activity. In this example, the system can use the peer group classification to select only relevant transaction models and not those transaction models that are unlikely to yield useful data metrics. For instance, if the restaurant's transactions are usually below a threshold value required to generate a suspicious activity report (SAR), e.g., $10,000, then processing the restaurant's transaction data with a transaction model that evaluates compliance with SAR regulations is not likely to produce useful data metrics since most of the restaurant's transactions fall outside the scope of SAR regulations. In this example, the system therefore utilizes peer group classification to select only the most relevant transaction models that are expected to provide useful data metrics, and thereby process transaction data using a directed technique that produces more precise transaction metrics. This technique identifies potentially anomalous activity with sufficient accuracy and/or improves the process associated with identifying potentially anomalous activity.

Moreover, the adaptive transaction processing techniques described herein enable a computing system to automate transaction processing in a way that provides improvements to manual transaction processing that can be performed by an end-user. For example, manual identification of potentially anomalous activity introduces significant latencies in transaction processing due to the large volume of transaction data that is typically required to be processed to make sufficiently accurate identifications. Manual identifications can be rendered obsolete if performed by a human (or a group of humans) due to amount of time required to track transaction information, during which entity activity may have changed to reflect different patterns. Manual transaction processing techniques therefore often fail to represent the most recent activity patterns since they rely on lagging activity indicators. In contrast, the automated transaction processing techniques described herein can increase processing throughput, which enables a computing system to process and evaluate transaction activity as entity performs them or within a short time period after the transaction activity is electronically recorded, e.g., a day after a bank account records a performed transaction. This allows the system to more dynamically evaluate transaction activity patterns in a manner that is not achievable using analogous manual transaction processing techniques.

Due to the large volume of transaction data that is often accumulated for entities, manually comparing individual transactions to historical transactional activity can be laborious and significantly reduces transaction analysis throughput compared to analogous automated techniques. Due to the time constraints in an end-user's ability to review and evaluate transaction data, manually processing often makes transaction evaluation unreasonable and unproductive. Manual comparisons of transaction data may also be susceptible to human error and can therefore reduce the overall accuracy of transaction evaluation.

The dynamic transaction processing techniques disclosed herein also enable the system to adapt transaction processing as activities of entities change over time. The system can dynamically adjust the normalcy standard for a peer group to coincide with changes in transaction activity patterns of entities over time. For instance, the system can adjust peer group classifications and/or attributes associated with peer group classifications to represent changes in entity activity. As an example, if an entity has recently moved its headquarters to a new location, then the peer group assigned to the entity can be adjusted so that the entity is assigned to a new peer group that includes entities operating in the new location. The system can also use learning techniques to identify changes in transaction activity patterns to readjust the constituency of peer groups, adjust attributes that define a peer group, or re-training transaction models used to identify potentially anomalous activity. The system therefore addresses an inherent limitation using static transaction processing techniques to evaluate anomalous in changing transaction activity, which is often unachievable using analogous manual evaluation techniques using static transaction evaluation criteria. In this manner, the system can adjust prediction parameters to improve anomalous activity identification over time, which is often more difficult to accomplish using manual transaction processing techniques.

The use of trained transaction models also provides various advantages over many conventional transaction reporting systems that evaluate transaction data based on static rules specifying triggers and/or fixed conditions to identify potentially anomalous activity. For example, the system applies peer group classifications for an entity to aggregate and evaluate transaction data in the context of other entities that are likely to perform similar transactions, thereby providing for accurate representation of normalized transactions. By evaluating transaction data for an entity relative to other entities within the peer group, the system is therefore capable of identifying at least two types of anomalies given a set of historical transaction data.

First, the system can identify transactions that are anomalous based on historical transaction activity of a given entity. For example, if historical transaction data indicates that the average transaction value of transactions for an entity is $500, then a transaction with a value of $5,000 can be identified as a potentially anomalous transaction relative to other verified transactions associated with the entity. Second, the system can identify potential anomalous transactions with respect to normalized transactions associated with other entities that are classified as belonging to the same peer group as a particular entity. For example, if historical transaction data for all entities assigned to the peer group indicates that the average transaction value of transactions is $1,000, then a transaction with a transaction value of $10,000 can be identified as a potentially anomalous transaction (irrespective of whether the transaction value resembles the transaction values of other prior transactions of the entity).

Moreover, the system can use the dynamic transaction processing techniques to improve the likelihood of identifying elusive transaction activity that may be undetectable using a static rule-based monitoring approach. For example, the system can use peer group classification technique to evaluate the transaction activity of a cleaning service provider relative to the transaction activity of other similar cleaning service providers in lieu of applying a static rule that requires only evaluation of transactions that satisfy a threshold amount, e.g., transactions with transaction values in excess of $10,000. Application of static rule may avoid the detection of, for example, suspicious transactions that do not satisfy the threshold amount but are otherwise used by the cleaning service provider for illicit purposes. However, by using the peer group classification of the cleaning service provider to compare transaction activity patterns to the transaction activity patterns of other similar cleaning service providers, the system can identify transactions (whether or not they satisfy a threshold value) that are not expected to be performed by the cleaning service provider.

In one general aspect, a computer-implemented method includes: obtaining, by a server system, peer group data indicating: (i) multiple entities classified as belonging to a particular peer group, and (ii) a set of attributes associated with the multiple entities; obtaining, by the server system and from one or more data sources, transaction data for the multiple entities; selecting, by the server system, one or more transaction models that are each trained to: (i) apply a particular set of evidence factors corresponding to the set of attributes associated with the multiple entities, and (ii) identify transaction patterns representing potentially anomalous activity; processing, by the server system and using the one or more transaction models, the transaction data for the multiple entities to identify potentially anomalous activity within the transaction data for the multiple entities; computing, by the server system and for each entity included in the multiple entities, a prioritization indicator based on the processing of the transaction data for the multiple entities, the prioritization indicator representing a likelihood that transaction data for a particular entity includes potentially anomalous activity; and enabling, by the server system, a user to perceive a representation of the priority indicators.

One or more implementations can include the following optional features. For instance, in some implementations, the set of attributes associated with the multiple entities includes an attribute representing a business classification shared by the multiple entities. In such implementations, the one or more transaction models includes a first machine learning model that is trained to (i) apply a set of evidence factors corresponding to transactions that are frequently performed by entities of the business classification shared by the multiple entities, and (ii) identify potentially anomalous transactions that have a likelihood of representing money laundering transactions. Additionally, the prioritization indicator are computed for each entity included in the multiple entities specifies a likelihood that transaction data for a particular entity includes transactions identified as potentially representing money laundering transactions.

In some implementations, the set of attributes associated with the multiple entities includes an attribute identifying a set of transaction types of transactions that are frequently performed by each entity included in the multiple entities. The potentially anomalous activity include transactions that have a transaction type that is not included in the set of transaction types of transactions that are frequently performed by each entity included in the multiple entities.

In some implementations, the set of attributes associated with the multiple entities includes an attribute identifying an average transaction value for transactions that are frequently performed by each entity included in the multiple entities. Additionally, the potentially anomalous activity include transactions that have a transaction value exceeding the average transaction value for transactions that are frequently performed by each entity included in the multiple entities.

In some implementations, the transaction data for each entity included in the multiple entities includes: historical transactions associated with the a particular entity over a particular time period; and an identification of reoccurring transactions associated with the particular entity over the particular time period.

In some implementations, the transaction data for each entity included in the multiple entities further includes a corpus of documents that are predetermined to satisfy one or more search criteria associated with a negative media search for the particular entity.

In some implementations, the prioritization indicator includes a score; and a value of the score represents a number of potentially anomalous transactions included in the transaction data for a particular entity.

In some implementations, the one or more transaction models include: a first transaction model that is trained to (i) apply a first set of evidence factors corresponding to the set of attributes associated with the entities, and (ii) identify a first set of potentially anomalous transactions within a particular set of transactions based on applying the first set of evidence factors, a second transaction model that is trained to (i) apply a second set of evidence factors corresponding to the set of attributes associated with the entities, and (ii) identify a second set of potentially anomalous transactions within a particular set of transactions based on applying the first set of evidence factors. In such implementations, the first set of potentially anomalous transactions and the second set of potentially anomalous transactions represent different types of transaction patterns. Additionally, processing the transaction data for the multiple entities includes: processing the transaction data using the first transaction model to identify the first set of potentially anomalous transactions within the transaction data for the multiple entities, and processing the transaction data using the second transaction model to identify the second set of potentially anomalous transactions within the transaction data for the multiple entities. Further, computing the prioritization indicator for each entity included in the multiple entities includes: computing, a first prioritization sub-indicator based on processing the transaction data for the multiple entities using the first transaction model, the first prioritization sub-indicator representing a likelihood that transaction data for a particular entity includes one or more of the first set of potentially anomalous transactions, and computing, a second prioritization sub-indicator based on processing the transaction data for the multiple entities using the second transaction model, the prioritization indicator representing a likelihood that transaction data for a particular entity includes one or more of the second set of potentially anomalous transactions. The first prioritization sub-indicator and the second prioritization sub-indicator are also aggregated to compute the prioritization indicator.

In some implementations, the first set of potentially anomalous transactions identified by the first transaction model includes transactions involving money laundering; and the second set of potentially anomalous transactions identified by the second transaction model includes transactions involving terrorist funding activities.

In some implementations, the transaction data obtained for the multiple entities includes a volume of transaction information; processing the transaction data for the multiple entities to identify potentially anomalous activity includes processing, by the server system, the volume of transaction information such that the potentially anomalous activity within the transaction data for the multiple entities is identified within a first time period after the transaction data for the multiple entities is obtained; and the first time period is shorter than a second time period required to manually process the volume of transaction information to identify the potentially anomalous activity within the transaction data for the multiple entities.

In some implementations, the transaction data for the multiple entities is periodically obtained by the server system as transaction data instances that are obtained at specified times; and the transaction data for the multiple entities is processed by the server system by processing each transaction data instance to identify potentially anomalous activity within each transaction data instance for the multiple entities.

The details of one or more implementations are set forth in the accompanying drawings and the description below. Other potential features and advantages will become apparent from the description, the drawings, and the claims.

BRIEF DESCRIPTION OF THE DRAWINGS

In the drawings, like reference numbers represent corresponding parts throughout.

DETAILED DESCRIPTION

Figure 1A:
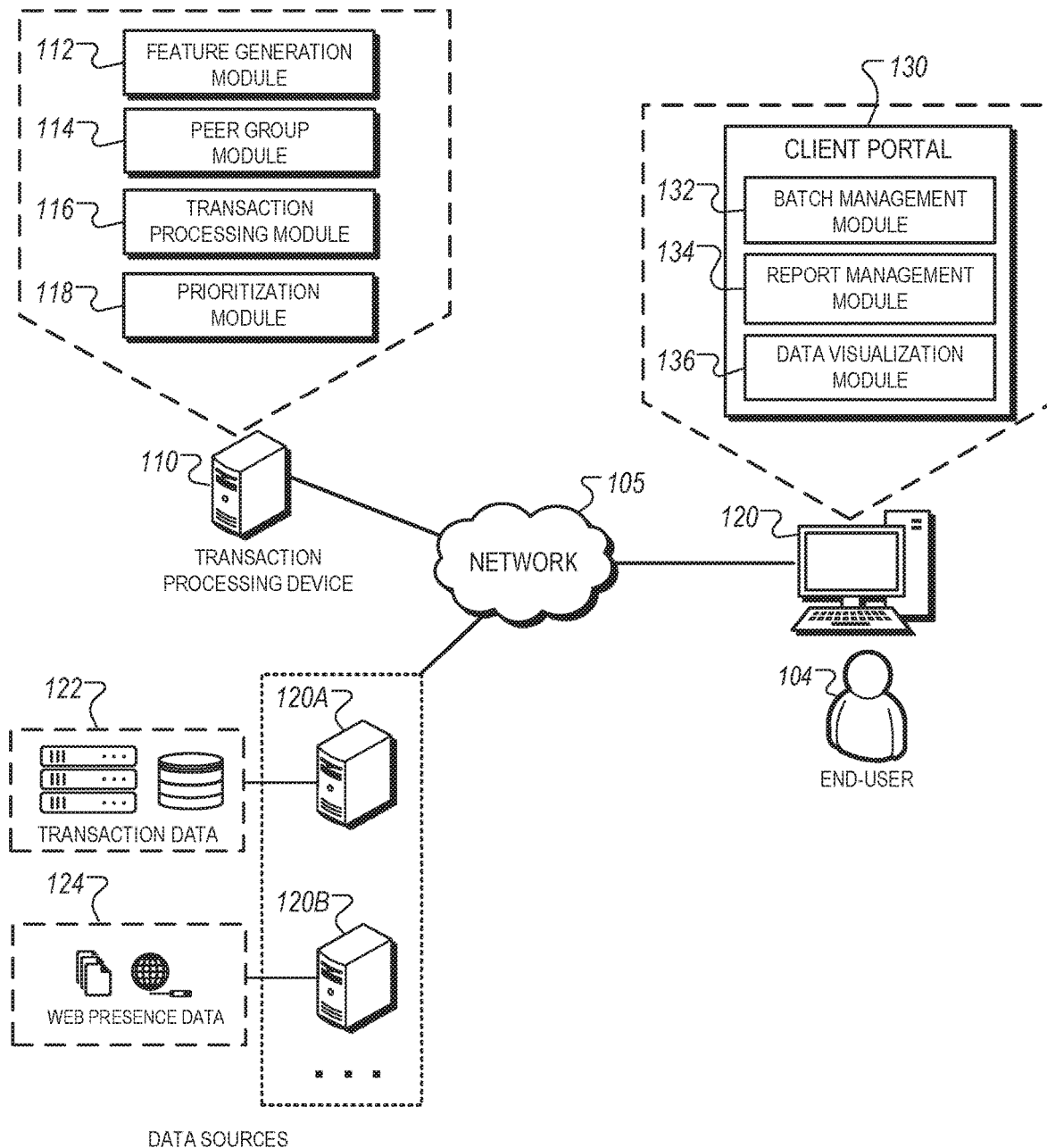
FIG. 1A is a diagram that illustrates an example of an adaptive transaction processing system.

In general, this disclosure describes systems and methods that are capable of applying adaptive transaction processing techniques to improve upon the identification of potentially anomalous activity. For example, anomalous activity can represent entities whose transaction activity is identified as having different attributes compared to transaction activity of other entities classified in the same peer group. As another example, anomalous activity can represent transactions of an entity identified as having different attributes compared to other transactions of the entity, transactions of other entities classified as being in the same peer group, or a combination of both.

The system determines anomalous activity in relation to a transaction context representing the nature of the transactions. To accomplish this, the system applies a set of transaction models that are trained to identify a specific type of anomaly based on evaluating normalcy within the transaction context. For example, a transaction may be considered anomalous if evaluated for representing money laundering activity but not anomalous if evaluated for representing tax evasion. In this example, the system applies different transaction models for money laundering activity and for tax evasion. The system trains and applies each model to identify different types of patterns reflecting the underlying activity. As discussed below, each model also specifies a set of evidence factors that the system uses as indicia to predict a likelihood that a transaction or entity is anomalous.

As described throughout, an "entity" refers to an individual or an organization associated with transactions that are of interest to an end-user such as a regulator or investigator. For example, an entity may be a corporation performing transactions that are evaluated for potentially anomalous activity to determine whether the corporation has potentially violated any laws or regulations enforced by a prosecuting agency such as the U.S. Department of Justice. In another example, an entity may be an individual that a banking institution runs a background investigation on prior to granting a loan or providing high-value financial services to the individual. In some other examples, an entity may be an account holder with the banking institution. In such examples, the banking institution may regularly monitor accounts of account holders to determine if any potentially anomalous activity has occurred in accordance with financial regulations placed on the banking institution.

In addition, a "peer group" refers to a classification for a group of entities based on a set of shared attributes. For example, a peer group can include money service businesses that conduct currency exchange transactions in Washington D.C. In this example, the entities assigned the peer group share the attributes of business classification, i.e., money service businesses, and geographic location, i.e., Washington D.C. As described below, the number of attributes that are shared amongst constituent entities of a peer group can be varied to adjust the level of similarity for entities to be classified in a peer group. In some instances, an entity can be assigned to multiple peer groups to reflect different types of similarity amongst entities. For example, an entity that is a restaurant can be assigned to a food service peer group as well as a peer group for entities having a gross revenue exceeding a threshold value.

As described herein, "attribute" refers to an individual measurable property or characteristic of a phenomenon being observed using machine learning or pattern recognition. Attributes, as described here in, can be numeric, e.g., average transaction value, or structural, e.g., strings and graphs used for syntactic pattern recognition. For example, attributes of an entity can be used as an informative, discriminating and/or identifying features of the entity for the purposes of pattern recognition, classification, or regression. As described below, attributes of an entity can be used to classify entity as belonging to a particular peer group. For example, entities classified as belonging to the same entity can each share a set of attributes that are associated with the peer group as whole.

As described herein, a "transaction" refers to an agreement between a buyer and seller to exchange goods, services, or financial instruments. For example, a transaction can refer to a transfer of currency from a sending entity to a recipient entity. Transactions, as described herein, can include electronic transactions, e g., transactions recorded on or using a computing device, or paper transactions, e.g., transactions recorded on paper without the use of a computer.

As described herein, "anomalous" activity refers to activity that is predicted to deviate from a specified standard, normal, or expected activity. For example, a transaction of an entity is deemed likely to be "anomalous" if the transaction deviates from historical transactions of the entity or if the transaction deviates from historical transactions of other entities that are classified to the same peer group as the entity. As another example, an entity is deemed to be "anomalous" if, for instance, it is identified as having an attribute that deviates from corresponding attributes of other entities classified to the same peer group, e.g., frequency of transactions, average transaction value, number and types of transacting partners, etc.

It should be noted that the system disclosed herein identifies potentially anomalous activities, i.e., activity that is likely to be anomalous, but does not provide an end-user with conclusions as to whether transaction activity is in fact actually anomalous. Instead, the system computes prioritization indicators based on pattern recognition analysis to identify activity having attributes that deviate from known attributes of activities associated with a peer group classification. The prioritization indicators can be used by an end-user as a way to filter activity to monitor and place greater emphasis on entities that are identified as having prioritization indicators indicating highest likelihoods of anomalous activity. In this respect, the end-user forms a conclusion as to whether an entity or a transaction is actually anomalous based on prioritizations provided for output by the system.

FIG. 1A illustrates an example of a system 100 that can identify potentially anomalous activity. The system includes a transaction processing device 110, a computing device 120, and data sources 120A and 120B that exchange communications over a network 105. The transaction processing device 110 includes a feature generation module 112, a peer group module 114, a transaction processing module 116, and a prioritization module 118. The computing device 120 runs software that displays a client portal 130 that includes a batch management module 132, a report management module 134, and a data visualization module 136. The data sources 120A, 120B store or otherwise obtain transaction data 122 and web presence data 124, respectively.

In general, the system 100 is capable of using adaptive transaction processing techniques to improve the identification of potentially anomalous activity in context-specific manner. As described throughout, potentially anomalous activity can include, for example, an identification of entities that are anomalous relative other entities classified to the same peer group, or identification of transactions that are anomalous relative to historical transactions of the entity or anomalous relative to transactions of other entities classified to the same peer group.

Referring now to the components of system 100, the transaction processing device 110 can be a server system that is capable of performing adaptive transaction processing techniques as described herein. The transaction processing device 110 includes software modules that perform various processes relating to training, generating, and applying transaction models to identify potentially anomalous activity. The feature generation module 112 can be used to identify attributes associated with peer group classifications for entities. The peer group module 114 is used to classify entities within one or more peer groups given a set of known attributes for each peer group. Examples of such attributes include features of transactions, such as transaction value, whether the transaction is a reoccurring transaction, or information about entities in a peer group, such as physical location, online presence, or an identification of key personnel. The transaction processing module 116 trains and/or applies a set of transaction models to identify patterns representing anomalous activity based on known patterns in training transaction data. The transaction processing module 116 also applies trained transaction models to identify potentially anomalous activity given a set of evidence factors specified in the trained transaction models. The prioritization module 118 processes the output of the transaction processing module 116 to determine a prioritization indicator for an entity. As discussed throughout, a prioritization indicator represents a determined likelihood that an entity is associated with anomalous activity, e.g., a likelihood that transactions performed by the entity represent potentially anomalous activity.

The computing device 120 can represent any type of network-enabled device that is used by the end-user 104 to access transaction data and/or other analysis techniques through the client portal 130. As examples, the transaction processing device 110 can be a smartphone, a tablet computing device, a laptop computing device, or a desktop computing device.

The client portal 130 can display interfaces that allow the end-user to perform various functions relating to transaction data. For example, the batch management module 132 allows the end-user to upload a list of entities to be analyzed by the transaction processing device 110 for anomalousness. The report management module 134 allows the end-user 104 to generate reports on potentially anomalous activity. In some instances, a generated report can include prioritization indicators for entities associated with transaction data analyzed by the transaction processing device 110. In such instances, the report can include a list of entities sorted by the prioritized indicator such that entities that are determined to have prioritized indicators with the largest numerical values are included in the top of the list. In such instances, the sorted list allows the end-user 104 to prioritize reviewing transactions of entities that have the highest likelihood of being associated with potentially anomalous activity.

The client portal 130 also includes a data visualization module 136 that allows the end-user 104 to generate charts and graphs to visualize transaction patterns by selected entities or groups of entities. For example, the data visualization module 136 can be used to generate a graph that represents changes in prioritization indicators computed for a particular entity over a specified time period. As another example, the data visualization module 136 can provide graphs representing comparisons of transaction metrics between entities that are classified as belonging to the same peer group, e.g., average transaction value, number of generated transactions, frequency of transactions over a specified time interval, number of disbursements, etc.

The data sources 120A and 120B can represent computing devices that store or otherwise provide access to transaction data that is processed by the transaction processing device 110. For example, the data source 120A can be a data server of a financial institution that stores transaction data 122 for customers that perform transactions through the financial institution. In this example, the transaction data 122 can include, for example, financial transactions, account activity, or other types of recorded actions that are typically stored in computer records for an account.

As another example, the data source 120B can be a web server associated with a search engine that stores or otherwise accesses web presence data 124 for entities associated with the web presence data 124. The web presence data 124 can identify online activity associated with the entities. In some instances, the web presence data 124 includes potentially derogatory information of an entity that is obtained through a negative media search, such as presence of the entity on a sanctioned list, criminal records associated with the entity, or judgments and liens that have been filed against the entity. In other instances, the web presence data 124 can also include web information that is used to determine entity attributes, such as online activities of an entity.

In some implementations, the transaction processing device 110 is managed by a service provider that is independent and distinct from a regulating entity associated with the end-user 104. In such implementations, the service provider that manages the transaction processing device 110 can provide the end-user 104 with access to data processed and generated by the transaction processing device 110 through the client portal 130. In other implementations, the transaction processing device 110 is a sub-system that operates within the same infrastructure as the computing device 120. For example, the transaction processing device 110 and the computing device 120 can be managed by a financial institution that analyzes transaction data generated by its customers. In such examples, the adaptive transaction processing techniques disclosed herein can be provided to the financial institution as a software product. The software product can include training data, training transaction models, and/or data analytics capabilities to enable the end-user 104 perform the transaction processing techniques without having to transmit transaction data to a third-party server, thereby reducing the likelihood of a security hack.

Figure 1B:
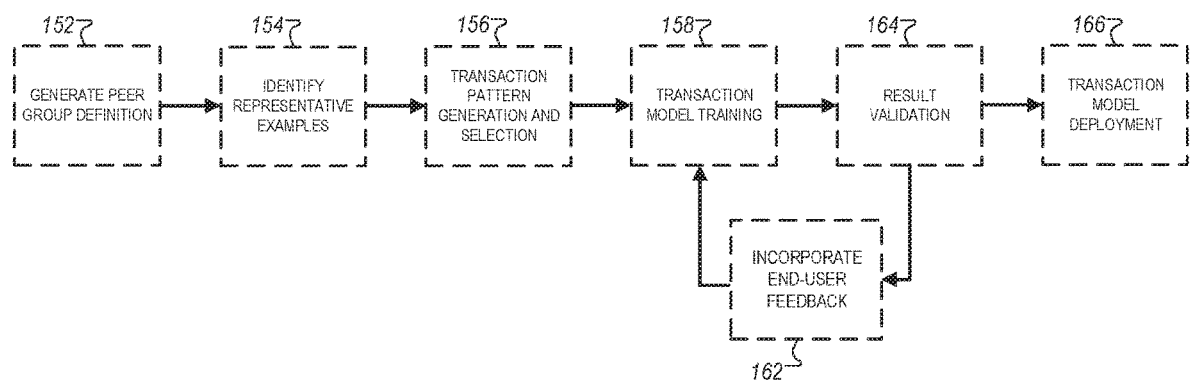
FIG. 1B is a diagram that illustrates an example of a technique used to develop an adaptive transaction processing system.

FIG. 1B is a diagram that illustrates an example of a technique used to develop an adaptive transaction processing system. In some instances, the technique can be used to train and improve the system 100 described herein with respect to FIG. 1A. The technique involves sequentially performing steps related to training transaction models applied by the system 100 to dynamically process transaction data using machine learning techniques.

As shown in FIG. 1B, peer group definitions are initially generated at step 152. A peer group definition can include entity attributes that are shared amongst entities that are classified in a peer group. For example, an entity definition can specify a geographic location where the entities conduct business operations, an industrial sector in which the entities operate, types of transactions that are most frequently performed by the entities, among others.

Representative examples of potentially anomalous activity are identified in step 154. In this step, the system 100 is provided with examples of anomalous activities that have been manually identified by an end-user, such as a regulator or financial services provider. The system 100 can receive both positive examples of anomalous activity, i.e., activity affirmatively representing anomalous activity, and negative examples of anomalous activity, i.e., activity having similar attributes to anomalous activity but not confirmed to actually represent anomalous activity. As described throughout, whether an activity is considered anomalous depends on the context surrounding the transaction. The examples provided to the system 100 therefore represent activity for a particular peer group classification and for a particular type of activity pattern. As an example, the manually identified data can specify examples of money laundering transactions for entities that operate as money service businesses in the United States. In this example, money laundering represents an activity pattern, and money service businesses in the United States represents the peer group classification.

Transaction patterns that are applied by the system 100 are generated and selected in step 156. In this step, end-users select transaction patterns that are used to positively identify potentially anomalous activity in transaction data. The transaction patterns can represent different scenarios in which anomalous activity can be identified. For example, transaction patterns for money laundering can be associated with a set of evidence factors, such as a large number of currency transactions below a reporting requirement, transactions with a large number of foreign accounts, or a larger volume of transactions compared to other entities in a peer group. As another example, transaction patterns for tax evasion can be associated with a set of evidence factors, such as frequent deposits to offshore bank accounts, inaccuracies in federal securities filings, and/or accounting anomalies in financial records.

The transaction patterns specified by each trained transaction model are identified based on user feedback as discussed above. For example, the transaction patterns can be identified by users during the model training and generation process so that end-users themselves can understand how the system identifies potentially anomalous activity. This aspect of the transaction patterns provides potentially higher predictive value compared to other machine learning models that rely on higher-dimensional moments of data, e.g., kurtosis of transaction amounts. However, because the transaction patterns themselves are human-interpretable, user feedback can be collected during the training process to build cases for anomalous activity and improve the likelihood of identifying discernible behaviors.

Transaction models to be applied by the system 100 are trained at step 158. In this step, transaction models for different types of anomalous activity are trained using training data that include positive examples of anomalous activity. The transaction models are analytical models that are used to predict the occurrence of a type of anomalous activity relative to a set of evidence factors for the type of anomalous activity. For example, the transaction models can apply different types of algorithmic prediction techniques, such as linear regression, logistic regression, decision tree models, Naïve Bayes, Random Forest, dimensionality reduction algorithms, gradient bosting algorithms, k-nearest neighbors, among others.

The system can use different types of training techniques to train the transaction models to predict potentially anomalous transaction activity. For example, the system can use a supervised learning technique where a target or outcome variable is predicted from a given set of predictors, and used to generate function that maps inputs to desired outputs. In this example, the training process is iterated until the model achieves a desired level of accuracy on training data, e.g., 85% percent accuracy in identifying potentially anomalous activity in training transaction data. In other examples, the system can use an unsupervised learning technique where there is no target or outcome variable to generate a prediction or estimate. In this example, training can be used for clustering a population in different groups, which is often used for segmenting customers in different groups for specific intervention. In some other examples, the system can use a reinforcement learning technique where the transaction models are applied to make specific decisions. For example, the system can be exposed to an environment where it trains itself continually using trial and error and, based on past experience, tries to capture the best possible knowledge to make accurate decision, e.g., using a Markov decision process.

Results of transaction model training are validated in step 164. In this step, manual feedback received from users is incorporated with transaction model training at step 162. In this step, end-users review predictions made by the system on training data is manually reviewed to provide feedback on the accuracy of predictions. The user feedback can be used to improve the system's prediction performance by, for example, identifying commonly missed anomalous activity, identifying common false positive identifications of anomalous activity, or improving the prediction technique employed by the system to determine potentially anomalous activity.

Transaction models are deployed at step 166. Once the system exhibit sufficient prediction performance, shown by user verification of training data predictions, the system can be deployed once in a production environment. As described throughout, once deployed, the system applies a set of trained transaction models, peer group classifications and associated attributes, to predict potentially anomalous activity in production transaction data with minimal or no human input.

Figure 2:
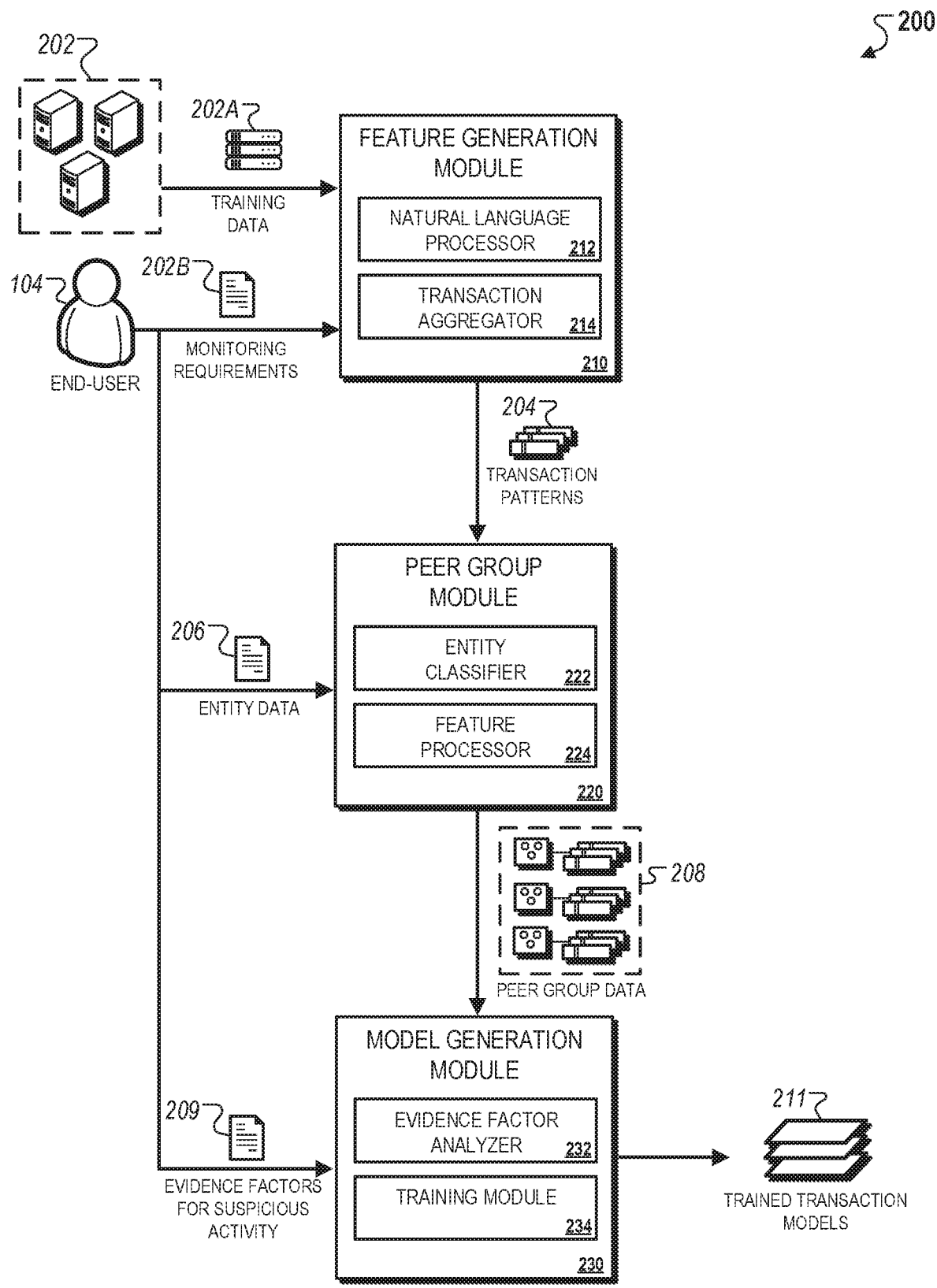
FIG. 2 is a diagram that illustrates an example of a technique that can be used to train an adaptive transaction processing system.

FIG. 2 is a diagram that illustrates an example of a technique that can be used to train an adaptive transaction processing system 200. The system 200 includes a feature generation module 210, a peer group module 220, and a model generation module 230. The feature generation module 210 further includes a natural language processor 212 and a transaction aggregator 214. The peer group module 220 further includes an entity classifier 222 and a feature processor 224. The model generation module 230 further includes an evidence factor analyzer 232 and a training module 234. In some instances, the system 200 can be a sub-system of the system 100. For example, the system 200 can include software components that are executed by the transaction processing device 110 as discussed herein.

Figure 4A:
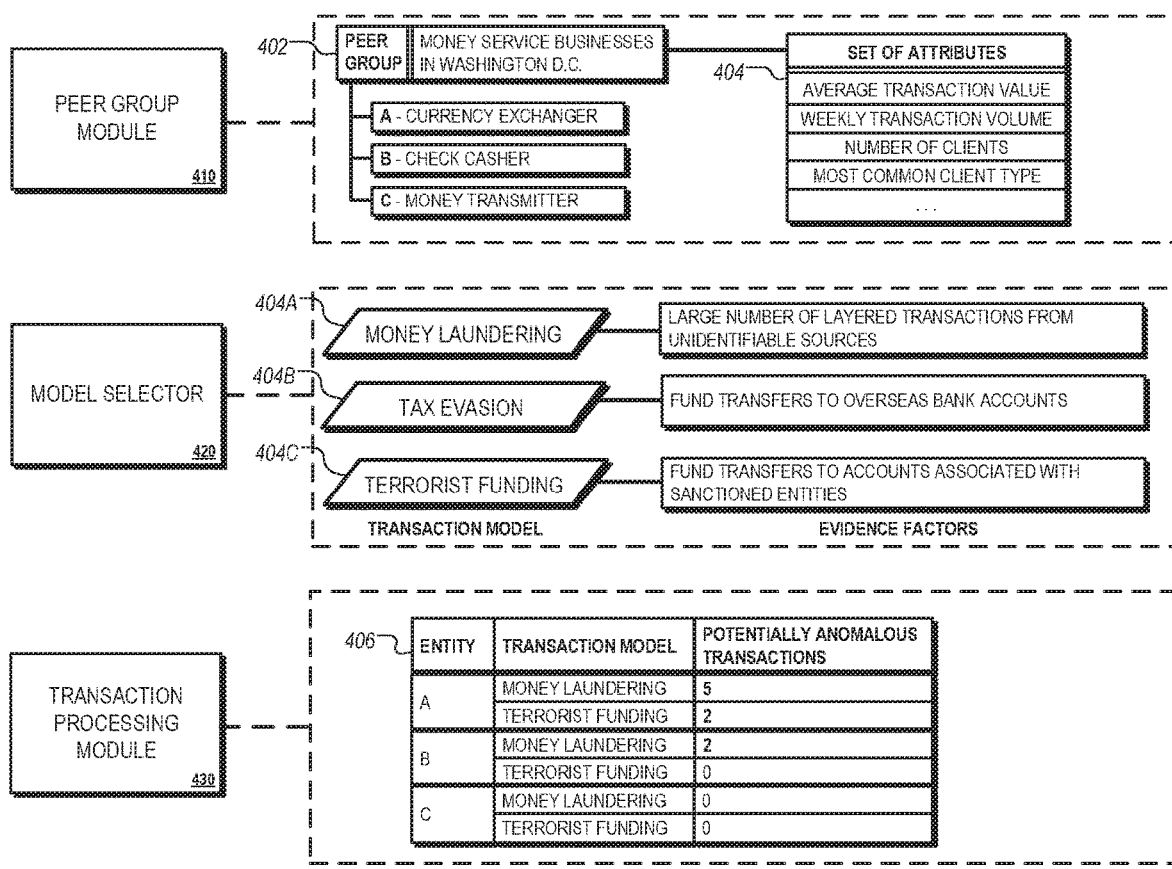
FIGS. 4A-B are diagrams that illustrate an example of a technique of identifying potentially anomalous activity for a peer group of money service businesses.
Figure 4B:
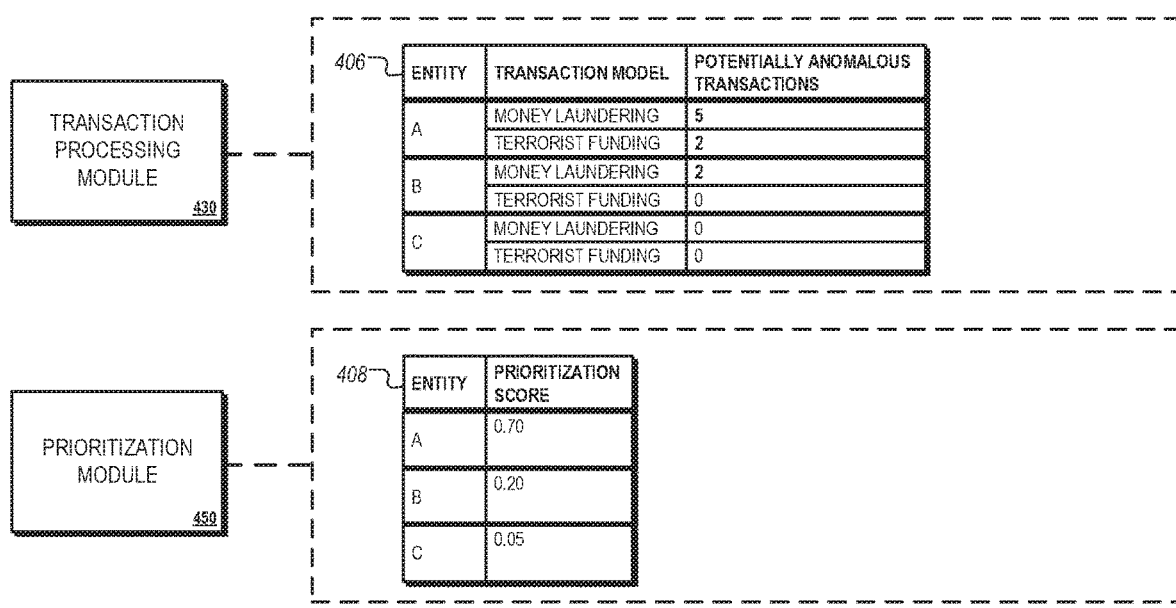

In general, the technique depicted in FIG. 2 can be used to train transaction models that are applied to predict the likelihood of potentially anomalous activity in a production environment. Once trained, each transaction model specifies a distinct set of evidence factors that are used to identify transaction patterns representing anomalous activity using machine learning techniques disclosed throughout. Examples of evidence factors specified by different transaction models are depicted in FIGS. 4A-B.

Referring now to the process depicted in FIG. 2, the feature generation module 210 receives training data 202A from data sources 202 and monitoring requirements 202B from an end-user 104. The training data 202A includes anomalous activity that are verified by an end-user as representing anomalous activity for a particular peer group classification.

The feature generation module 210 also receives a set of monitoring requirements 202B specified by the end-user 104. The monitoring requirements 202B can specify transaction processing procedures that are used by an institution that evaluates transaction data for anomalous activity. For example, the monitoring requirements 202B can specify monitoring criteria used by an institution uses to satisfy regulatory reporting requirements. As another example, the monitoring requirements 202B can specify the types of transaction activity that are relevant to the customer from among data of its customers.

In processing the contents of the training data 202A, the natural language processor 212 identifies transaction information used for identification and analysis. For example, the natural language processor 212 can classify transactions in the training data 202 as belonging to certain transaction categories, segment transactions that are associated with the same entity, among others. In some instances, the training data 202 is formatted as a table that includes plain text and labels that reference structured variables. For example, the table can include a label indicating that a transaction was included in a Suspicious Activity Report and a record that includes a narrative description of suspicious behavior associated with the transaction that resulted in the transaction being included in the Suspicious Activity Report. Once identified and parsed by the natural language processor, the transaction information is then provided to the transaction aggregator 214.

The transaction aggregator 214 identifies a transaction type of each transaction included in the entity transaction data and aggregates the transactions into a set of transaction patterns. For example, the transaction aggregator 214 can identify different types of transaction fields referenced in the training data 202A, and transaction classifications for transactions identified by the natural language processor 212 within the training data 202A. The transaction aggregator 214 also determines a set of normalized patterns present within the training data 202A that are used to determine whether entity activity represents potentially anomalous activity.

The feature generation module 210 generates transaction patterns 204 based on the output of the transaction aggregator 214. For example, the feature generation module 210 can identify patterns, such as patterns are shared by transactions of the same type, patterns that are shared by transactions of the same types of entities. As examples, transaction patterns can include average transaction value, transaction frequency, among others.

The peer group module 220 generates peer group data 208 based on the transaction patterns 204 and entity data 206. The peer group data 208 classifies entities within the entity data 206 within specified peer groups based on shared attributes. The peer group data 208 can identify entities that are assigned to each peer group, and a set of attributes that are shared amongst the entities of the same peer group. For example, the peer group data 208 can identify a peer group that includes money service businesses and another peer group that includes banks. In this example, the peer group including money service businesses specifies attributes unique to money service businesses, such as transactions involving cashier's checks, money orders, or traveler's checks. In contrast, the peer group including banks specifies a set of attributes unique to banks, such as customer financial transactions, account deposits and withdrawals, or wire transfers.

The model generation module 230 trains a set of transaction models using the peer group data 208 and evidence factor data 209 to generate trained transaction models 211. As discussed above, the transaction models can be training using different training techniques, such as supervised learning, unsupervised learning, or reinforced learning, depending on the application of the transaction model. Each transaction model can be associated with a distinct set of evidence factors that are applied to identify transaction patterns representing anomalous activity relative to a specified peer group. In this manner, the trained transaction models 211 can be applied to different peer groups to dynamically identify anomalous activity in different transactional contexts. For example, when applying a transaction model for money laundering, a transaction for a peer group including money services can be found to be anomalous. In this example, if the system applies the same transaction model to the same transaction, but for a different peer group that includes bank, the transaction can be found to not be anomalous due to differences in attributes amongst the two peer groups. In this respect, the determination of anomalous activity is contextualized by the attributes specified by each peer group.

Figure 3:
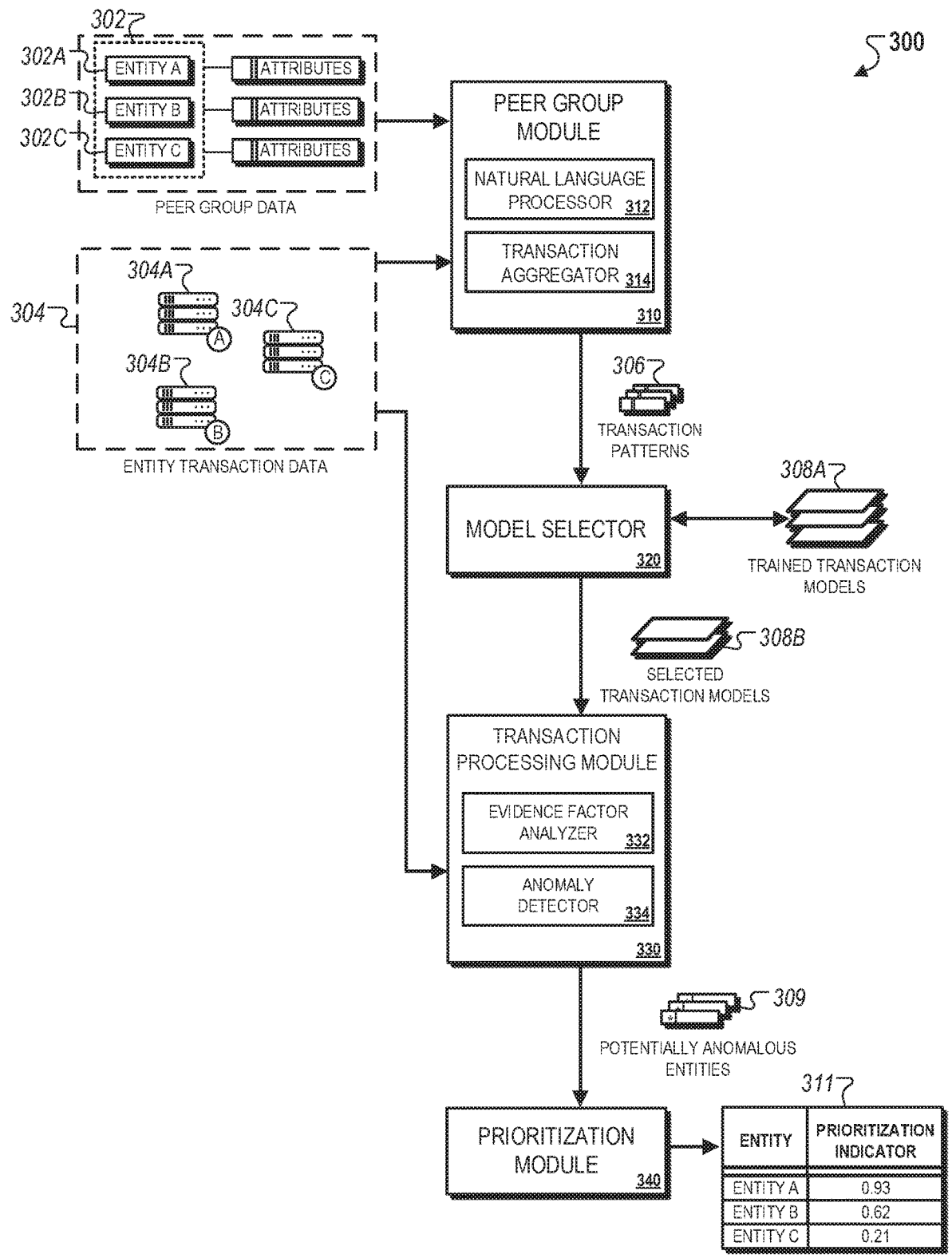
FIG. 3 is a diagram that illustrates an example of a technique that can be used to identify potentially anomalous activity of entities that are classified as belonging to a certain peer group.

FIG. 3 is a diagram that illustrates an example of a technique that can be used to identify potentially anomalous activity of entities that are classified as belonging to a certain peer group. The system 300 includes a peer group module 310, a model selector 320, a transaction processing module 330, and a prioritization module 340. The peer group module 310 further includes a natural language processor 312 and a transaction aggregator 314. The transaction processing module 330 further includes an evidence factor analyzer 332 and an anomaly detector 334. In some instances, the system 300 can be a sub-system of the system 100. For example, the system 300 can include software components that are executed by the transaction processing device 110 as discussed herein.

In general, the technique depicted in FIG. 3 can be used to apply trained transaction models in a production environment to identify potentially anomalous activity in transaction data using the adaptive transaction processing techniques described throughout. As described below, transaction models representing different transaction patterns can be used to vary the type of anomalous activity to be identified. Additionally, because anomalous activity for a particular entity is identified relative to activities of other entities that are classified as belonging to the same peer group as the particular entity, the likelihood of identifying false positives and false negatives is reduced by contextualizing the prediction process.

Referring now to the process depicted in FIG. 3, the peer group module 310 receives peer group data 302. The peer group data 302, in this example, identifies for entities 302A, 302B, and 302C. The entity transaction data 304 includes transaction data for each entity identified in the transaction data, e.g., transaction data 304A for entity 302A, transaction data 304B for entity 302B, and transaction data 304C for entity 302C. Entities 302A-C are classified as belonging to the same peer group. The peer group is associated with a set of attributes of the entities 302A-C, e.g., business classification, industrial sector, transaction volume, geographic location, etc.

The peer group module 310 also receives entity transaction data 304 for the entities 302A-C. In some instances, the entity transaction data 304 is obtained from a data upload provided by the regulator, e.g., using batch data upload through the batch management module 132 of the client portal 130. In other instances, the entity transaction data 304 is extracted from an associated database, such as a database associated with the computing device 120 that stores transaction data for entities that are monitored by the end-user 104. In some other instances, the entity transaction data 304 is obtained from an external data source, i.e., a data source that is external from, and independently managed by, a third-party data provider that is independent and distinct from the institution associated with the end-user 104. For example, the entity transaction data 304 can include web presence data of entities 302-C representing online activities performed by the entities 102A-C. In other examples, the entity transaction data 304 includes information obtained from public records, such as court filings, sanction lists, among others.

The natural language processor 312 processes the entity transaction data 304 in a similar manner as discussed above with respect to the natural language processor 212. For example, the natural language processor 312 can classify transactions in the entity transaction data 304 as belonging to certain transaction categories, segment transactions that are associated with the same entity, among others. The transaction information is then provided to the transaction aggregator 314.

The transaction aggregator 314 identifies transaction patterns 306 based on processing the peer group data and the data generated by the natural language processor 312. The transaction patterns 306 can include a set of filtered information that represent pertinent portions of the entity transaction data 304 to be analyzed by the transaction processing module 330, transaction fields included within the transaction data, among others. The transaction patterns 306 are provided as input to the model selector 320 to identify the appropriate transaction model to apply in analyzing the transaction patterns 306.

The model selector 320 selects a set of transaction models 308B from among a set of trained transaction models 308A based on the transaction patterns 306. Each transaction model included in the trained transaction models 308A can identify transaction patterns representing a different type of anomalous activity, whereas the selected transaction models 308B can represent transaction models identifying patterns of interest to an end-user. For example, if the end-user is a regulator of bank that is interested in identifying suspicious transaction activities its customers, then the model selector 320 can select only those transaction models that are relevant to identifying suspicious activities associated with bank accounts. In this example, the model selection process is used by the system 300 to customize the transaction processing techniques employed by the transaction processing module 330 in identifying potentially anomalous activity. In some instances, such as the examples depicted in FIGS. 4A-B, the model selector 320 can select multiple transaction models from among the trained transaction models 308A to ensure that the entity transaction data 304 is simultaneously evaluated with respect to different types of transaction patterns. For example, a transaction model for possible money laundering activity can be selected along with another transaction model for possible tax evasion activity to permit the transaction processing module 330 to identify transactions that are predicted to be implicated with either type of activity or both types of activity. In some instances, the application of multiple transaction models enables the system 300 to identify those transactions that represent transaction patterns for different types of potentially anomalous activity, which can then be used to adjust the computation of prioritization indicators. For example, a transaction or entity that is identified to be associated with transaction patterns of multiple transaction models can be designated to have a higher prioritization score than other transactions or entities that are identified to only be associated with a single transaction model. In this example, a larger number of transaction patterns being associated with a single transaction or a single identity increases the likelihood that the transaction or entity is associated with anomalous activity, and is thereby assigned a higher prioritization score.

The transaction processing module 330 processes the entity transaction data 304 using the selected transaction models 308B to identify potentially anomalous entities 309 within the entity transaction data 304. As discussed above, the transaction processing module 330 identifies potentially anomalous activity based on comparing transaction patterns of transactions within the entity transaction data 304 and transaction patterns specified by the selected transaction models 308B, and using statistical inference techniques to determine whether the similarity satisfies specified thresholds. Additionally, the potentially anomalous activity of an entity represent those transactions that have attributes that differ from the attributes of transactions of other entities that are classified to the same peer group as the entity.

In some implementations, the transaction process module 330 additionally, or alternatively, identifies potentially anomalous entities from among the entities identified in the peer group data 302. For example, the transaction processing module 330 can identify the entity 302A as representing an anomalous entity if transactions within the transaction data 304A have attributes that deviate from the shared attributes specified within the peer group data 302. In another example, the transaction processing module 330 can identify the entity 302A as representing an anomalous entity if transaction data 304A includes transactions deviate from prior recurring transactions that are identified as being frequently performed by the entity 302A.

The prioritization module 340 generates a table 311 that indicates a prioritization indicator for each entity within the potentially anomalous entities 309. In the example depicted in FIG. 3, the table 311 includes a prioritization score that is computed for each entity. For instance, the entity 302A has a score with a value of 0.93, which indicates that this entity has been determined to be most likely to be associated with anomalous activity from among the other entities in the peer group data 302, such as the entities 302B and 302C. In some other examples, the table 311 can include prioritization indicators for transactions included in the entity transaction data 304. In such examples, the table 311 identifies potentially anomalous transactions based on transactions patterns specified in the selected transaction models 308B, and relative to other transactions within the entity transaction data 304, other transactions associated with the same entity, or both.

In some implementations, the system 300 is capable of using similar techniques to process the entity transaction data 304 on a transaction-by-transaction basis, i.e., identifying potentially anomalous transactions within the entity transaction data 304. In such implementations, the prioritization module 340 can compute a prioritization indicator for each potentially anomalous transaction that is identified as well as a prioritization indicator for entities 302A, 302B, and 302C. In some instances, the prioritization module 340 computes the prioritization indicator for a particular entity based on combining the prioritization indicators for all potentially anomalous transactions identified for that particular entity. For example, if the system 300 identifies three potentially anomalous transactions for the entity 302A within the entity transaction data 304A, the prioritization indicator for the entity 302A within the table 311 is computed based on combining the three prioritization indicators for the three transactions.

FIGS. 4A-B are diagrams that illustrate an example of a technique of identifying potentially anomalous transactions for a peer group of money service businesses. In this example, a system includes a peer group module 410, a model selector 420, a transaction processing module 430, and a prioritization module 450. In some implementations, the components depicted in FIG. 4 are subcomponents of the system 100 depicted in FIG. 1. For example, the components can be implemented on the transaction processing device 110.

Referring initially to FIG. 4A, the peer group module 410 initially processes data of the peer group 402 to identify a set of attributes 404. The peer group 402, in the example depicted in FIG. 4A, includes three entities that are classified as money service businesses having operations in Washington D.C. The entities include a money exchanger, a check cashier, and a money transmitter. The set of attributes 404 includes attributes that are shared between the entities classified as belonging to the peer group 402. For example, the attributes 404 includes an average transaction value, a weekly transaction volume, a number of clients of each entity, and a common client type. As described throughout, the attributes 404 can be used to determine a baseline level of similarity between entities to define a set of normalized transaction parameters for the peer group.

The model selector 420 identifies three transaction models to evaluate transaction data. In the example, transaction model 404A is used to analyze possible money laundering activity, transaction model 404B is used to analyze possible tax evasion, and transaction model 404C is used to analyze possible terrorist funding. As discussed throughout, each transaction model specifies different evidence factors that are used to predict whether transaction activity of an entity is potentially anomalous relative to the type of transaction pattern specified by a transaction model. For example, the transaction model 404A specifies an evidence factor relating to a large number of layered transactions from unidentifiable sources, the transaction model 404B specifies an evidence factor relating to fund transfers to overseas bank accounts, and the transaction model 404C specifies an evidence factor relating to fund transfers to accounts associated with sanctioned entities.

The transaction processing module 430 processes transaction data for the peer group 402 and identifies potentially anomalous transactions with respect to transaction models 404A and 404C in table 406. In this example, the table 406 includes prioritization scores for each transaction model selected by the model selector 420 to evaluate the transaction data, e.g., transaction models 404A and 404C. For instance, the table 406 specifies five transactions associated with entity "A" that were identified for potential money laundering activity, two transactions associated with entity "A" that were identified for potential terrorist funding activity, and two transactions that were identified for potential money laundering activity for entity "B." In other examples, the transaction processing module 430 processes transaction data in a more holistic fashion rather than evaluating attributes of single transactions. For example, the transaction processing module 430 can identify potentially anomalous activity based on timing between reoccurring transaction instances, changes in account balances before and after certain transactions (beyond those triggered by the transaction itself), or other types of relationships between transactions of the same entity.

Referring now to FIG. 4B, the prioritization module 450 computes prioritization scores for each of the three entities, which are identified in table 408. In this example, the table 408 includes prioritization scores computed for the three entities classified as belonging to the peer group 402. As shown, entity "A" is assigned the highest prioritization score with a value of 0.70, and entity "C" is assigned the lowest prioritization score with a value of 0.05. In this example, the prioritization module 450 computes the highest prioritization score for entity "A" because the table 406 identifies the largest number of potentially anomalous transactions, as well as potentially anomalous transactions relative to different transaction patterns, e.g., money laundering and terrorist funding. The value of the prioritization score computed for entity "A" thereby indicates that this entity has the highest likelihood of being associated with potentially anomalous activity. In contrast, the prioritization module 450 computes the lowest prioritization score for entity "C" because the table 406 identifies zero potentially anomalous transactions for either transaction pattern that is evaluated by the transaction processing module 430.

Figure 5:
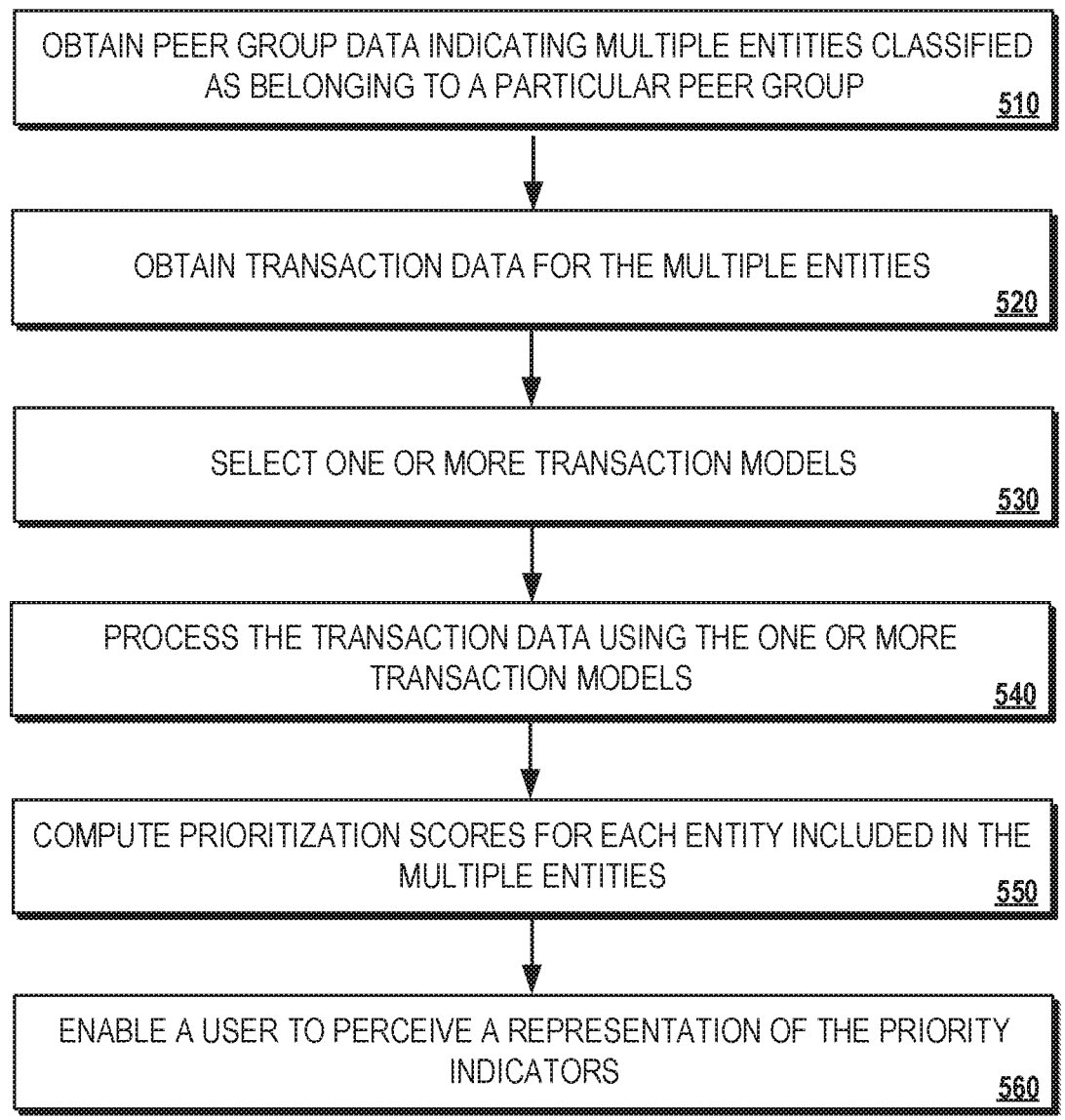
FIG. 5 is a flowchart that illustrates an example of a process for computing prioritization scores for entities based on the identification of potentially anomalous activity.

FIG. 5 is a flowchart that illustrates an example of a process 500 for computing prioritization scores for entities based on the identification of potentially anomalous transactions. Briefly, the process 500 includes the operations of obtaining peer group data indicating multiple entities classified as belonging to a particular peer group (510), obtaining transaction data for the multiple entities (520), selecting one or more transaction models (530), processing the transaction data using the one or more transaction models (540), computing prioritization scores for each entity included in the multiple entities (550), and enabling a user to perceive a representation of the priority indicators (560).

In more detail, the process 500 includes the operation of obtaining peer group data indicating multiple entities classified as belonging to a particular peer group (510). The transaction processing device 110 can obtain peer group data 302 for multiple entities 302A-C. As discussed above in reference to FIG. 3, the peer group data 302 can identify the entities 302A-C as belonging to a particular peer group, e.g., money service businesses in a particular geographic location. The peer group data 302 also identifies a set of attributes associated with the multiple entities. In some instances, the features can be human-interpretable features, i.e., features that can be understood by an end-user as describing a type of entity.

The features identified in the peer group data 302, can represent different types of attributes of the entities 302A-C. In some implementations, the set of attributes includes an attribute representing a business classification shared by the multiple entities. For example, as depicted in FIGS. 4A-B, the peer group 402 identifies entities as being classified as money service businesses that perform transactions in Washington D.C.

As discussed throughout, the attributes can identify a geographic location in which the entities perform transactions, types of transactions that are frequently executed by the entities, an average transaction value for transactions performed by the entities, a regulatory reporting protocol that governs transactions performed by the entities, among others.

The process 500 includes the operation of obtaining transaction data for the multiple entities (520). The transaction processing device 110 can obtain entity transaction data 304 for multiple entities 302A-C. The entity transaction data 304 includes transactions 304A-304C for each of the entities 302A-C, respectively.

The process 500 includes the operation of selecting one or more transaction models (530). The transaction processing device 110 can select one or more transaction models 308 from among trained transaction models 308A. Each transaction model within the trained transaction models 308A may apply a particular set of evidence factors corresponding to the set of attributes associated with multiple entities and identify potentially anomalous entities from among the multiple entities. For example, as shown in FIGS. 4A and 4B, transaction models 404A, 404B, and 404C are each associated with a set of evidence factors that are applied to distinguish potentially anomalous transaction activity relative to normalized transaction activity associated with the peer group 402. For instance, the transaction model 404A is trained to identify transaction activity indicating money laundering based on applying evidence factors such as the presence of large numbers of layered transactions from unidentifiable sources within transaction data for a particular entity.

The process 500 includes the operation of processing the transaction data using the one or more transaction models (540). The transaction processing device 110 can process the transaction data to identify potentially anomalous transactions within the transaction data for the multiple entities using selected transaction models. For example, as shown in FIGS. 4A and 4B, transaction models 404A and 404B can be selected and used to process transaction data for entities assigned to peer group 402. In this example, the transaction processing device 110 identifies transaction anomalies that are likely to represent money laundering activity and terrorist funding.

As discussed above, the transaction processing device 110 can evaluate different types of potentially anomalous activity. In some implementations, the transaction processing device 110 evaluates potential anomalies with respect to normalized transactions associated with a particular entity. For example, if historical transaction data indicates that the average transaction value of transactions for an entity is $500, then a transaction with a transaction value of $5,000 can be identified as a potentially anomalous transaction relative to other verified transactions associated with the entity. Such a transaction might be normal for another entity.

In other implementations, the transaction processing device 110 evaluates potential anomalies with respect to normalized transactions associated with other entities that are classified as belonging to the same peer group as a particular entity. For example, if historical transaction data for all entities assigned to the peer group indicates that the average transaction value of transactions is $1,000, then a transaction with a transaction value of $10,000 can be identified as a potentially anomalous transaction (irrespective of whether the transaction value resembles the transaction values of other prior transactions of the entity).

In some other implementations, the transaction processing device 110 can evaluate potential anomalies relative to both transactions of a particular entity and transactions of other entities assigned to the same peer group as the particular entity. For example, the transaction processing device 110 can use a weighting technique that combines an anomaly assessment relative to transactions of other entities and an anomaly assessment relative to other transactions of the particular entity.

As discussed throughout, the transaction processing device 110 is capable of using various techniques to increase transaction processing throughput such that the identification of potentially anomalous activity can be performed within a specified time period after transaction data is obtained by the transaction processing device 110. For example, transaction activity of account holders of a banking institution during a particular day can be electronically recorded by a data server of the banking institution by 5 PM ET, and provided to the transaction processing device 110 by 7 PM ET. In this example, because potentially anomalous transactions are reported to the banking institution on a daily basis, the banking institution can take action on associated account holders more quickly than if, for example, transaction data is processed on a weekly or monthly basis. In some instances, the transaction processing device 110 can configured use different types of processing techniques to enable a configurable time period within which potentially anomalous activity is identified. For example, the transaction processing device 110 can use a lower accuracy but higher speed processing technique for higher activity reporting frequencies, e.g., daily reporting, and a higher accuracy but lower speed processing technique for lower activity reporting frequencies, e.g., month reporting.

Additionally, the transaction processing device 110 is capable of processing the transaction data with reduced latency compared to analogous manual processing techniques. For example, the transaction processing device 110 can process a volume of transaction information in a time period that is shorter than the time period to manually process the same volume of transaction information and outperforms existing [static systems] as it relates to utility and precision. In some instances, due to the large volume of transaction information required to accurately identify potentially anomalous activity, the time period to manually process transaction data is so high that it renders the processing useless or obsolete. For example, it may take a human (or a group of humans) approximately one to two weeks to review a large volume of transaction information transaction data collected over a one-month time period. However, given that the processing time period, e.g., one to two weeks, is roughly half of the time period over which transaction data is collected, e.g., one month, then the potentially anomalous activity identified may no longer be relevant to current activity if the entity has changed their activity pattern during the processing time period. Faster processing time using the automated techniques described herein address this inherent limitation by reducing the time period required to identify potentially anomalous activity so that end-users can identify activity patterns that are more likely to represent present activity patterns.

In some implementations, the transaction processing device 110 obtains and processes transaction data on a periodic basis. For example, the transaction processing device 110 can periodically obtain transaction data for the multiple entities, e.g., on a weekly basis, as transaction data instances that are obtained at specified times, e.g., each Monday of a new week. In such implementations, the transaction processing device 110 can process each transaction data instance to identify potentially anomalous activity within each transaction data instance for the multiple entities. For example, the transaction processing device 110 can process the weekly transaction data to identify potentially anomalous activity for each week and report the findings to the end-user by Sunday of the same week.

The process 500 includes the operation of computing prioritization scores for each entity included in the multiple entities (550). The transaction processing device 110 can compute prioritization indicators for entities that are classified as belonging to a particular peer group. In some implementations, the prioritization indicators are numerical values that reflect a likelihood that an entity is associated with at least one potentially anomalous transaction. For example, as shown in FIG. 4B, the table 408 includes prioritization scores with values representing probabilities that entity transaction data includes at least one potentially anomalous transaction. In other implementations, the prioritization indicators are labels that categorizations for each entity. For example, a prioritization indicator can be one of a "HIGH," "MEDIUM," or "LOW", where that label that indicates the assessed likelihood that an entity is associated with a potentially anomalous transaction.

The process 500 includes the operation of enabling a user to perceive a representation of the priority indicators (560). For example, the transaction processing device 110 can provide data representing the priority indicators for output to the computing device 120 of the end-user 104. As discussed above, the end-user 104 can be a regulator associated with a regulating financial institution that reviews transaction data for suspicious activity, e.g., fraudulent transactions, money laundering, financing criminal activity, among other types of financial crimes. In some implementations, the computing device 120 access the output data through a webpage-based portal that allows the end-user 104 to access data generated by the transaction processing device 110. Alternatively, in other implementations, the computing device 120 can run an application that provides the end-user 104 with access to the prioritization indicators. For example, the computing device 120 can be desktop computing devices that runs a software through which the prioritization indicators are displayed for output. As another example, the computing device 120 can be a mobile computing device that runs a mobile application through which the prioritization indicators are displayed for output.

Figure 6:
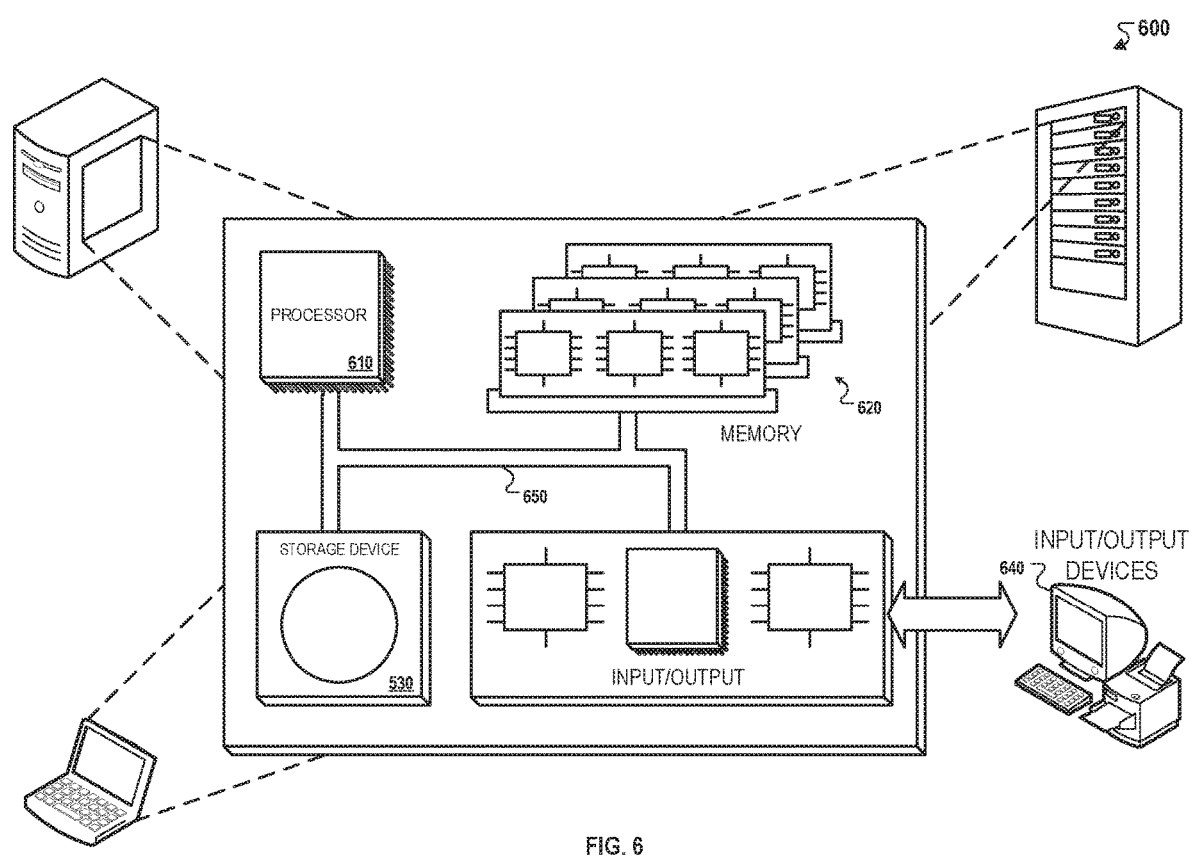
FIG. 6 is a diagram that illustrates an example of a computer system that may be applied to any of the computer-implemented methods and other techniques described herein.

FIG. 6 is a schematic diagram of a system 600. The system 600 can be used to carry out the operations described in association with any of the computer-implemented methods described previously, according to some implementations. In some implementations, computing systems and devices and the functional operations described in this specification can be implemented in digital electronic circuitry, in tangibly embodied computer software or firmware, in computer hardware, including the structures disclosed in this specification (e.g., system 600) and their structural equivalents, or in combinations of one or more of them. The system 600 is intended to include various forms of digital computers, such as laptops, desktops, workstations, personal digital assistants, servers, blade servers, mainframes, and other appropriate computers, including vehicles installed on base units or pod units of modular vehicles. The system 600 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that can be inserted into a USB port of another computing device.

The system 600 includes a processor 610, a memory 620, a storage device 630, and an input/output device 640. Each of the components 610, 620, 630, and 640 are interconnected using a system bus 640. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems.

Accordingly, other embodiments are within the scope of the following claims.

The invention claimed is:

1. A computer-implemented method comprising:
   training, by a server system, at least (i) a transaction model to apply a first set of evidence factors to identify potentially anomalous activity associated with an activity pattern type;
   classifying, by the server system and based on a set of attributes of a target entity, the target entity as belonging to at least (i) a first peer group of entities that share a first set of attributes and (ii) a second group of entities that share a second set of attributes, wherein the first peer group and the second group comprise at least one unique entity that is only included either the first peer group or the second peer group;
   obtaining, by the server system and from one or more data sources, transaction data for the target entity, transaction data for entities included in the first peer group, and transaction data for entities included in the second peer group;
   selecting, by the server system, the trained transaction model based on the set of attributes of the target entity;
   processing, by the server system and using the trained transaction model, the transaction data for the target entity in relation to the transaction data for entities included in the first peer group to determine a first indicator for the target entity, wherein the first indicator represents a first classification of normalcy relative to transaction data of the first peer group with respect to the activity pattern type given the first set of attributes;
   processing, by the server system and using the trained transaction model, the transaction data for the target entity in relation to the transaction data for entities included in the second peer group to determine a second indicator for the target entity, wherein:
      the second indicator represents a second classification of normalcy relative to transaction data of the second peer group with respect to the activity pattern type given the second set of attributes, and the second classification of normalcy is different from
the first classification of normalcy;

determining, by the server system and based on the first indicator, that transaction data for the target entity is potentially anomalous relative to the first classification of normalcy;

determining, by the server system and based on the second indicator, that transaction data for the target entity is not potentially anomalous relative to the second classification of normalcy;

adjusting, by the server system, the activity pattern type based on determining that transaction data for the target entity is (i) potentially anomalous relative to the first classification of normalcy and (ii) is not potentially anomalous relative to the second classification of normalcy;

generating, by the server system, a second set of evidence factors based on adjusting the activity pattern type;

re-training, by the server system, the transaction model to apply the second set of evidence factors to identify potentially anomalous activity associated with the activity pattern type that was adjusted;

computing, by the server system and for the target entity, a prioritization indicator based at least on combining the first indicator and the second indicator, wherein the prioritization indicator is biased towards the first indicator based on transaction data of the target entity being determined to (i) be potentially anomalous relative to the first classification of normalcy and (ii) not be potentially anomalous relative to the second classification of normalcy; and enabling, by the server system, a user to perceive a representation of the priority indicator.

2. The method of claim 1, wherein:
the set of attributes of the target entity comprises an attribute representing a business classification shared by the first set of entities;
the transaction model comprises a machine learning model that is trained to (i) apply the first set of evidence factors corresponding to transactions that are frequently performed by entities of the business classification shared by the entities included in the first peer group, and (ii) identify potentially anomalous transactions that have a likelihood of representing money laundering transactions; and
the prioritization indicator computed for the target entity specifies a likelihood that transaction data for the target entity includes transactions identified as potentially representing money laundering transactions.

3. The method of claim 1, wherein:
the first set of attributes associated with entities included in the first peer group comprises an attribute identifying a set of transaction types of transactions that are frequently performed by each entity included in the first peer group; and
the first indicator specifies transactions that have a transaction type that is not included in the set of transaction types of transactions that are frequently performed by each entity included in the first peer group.

4. The method of claim 1, wherein:
the first set of attributes comprises an attribute identifying an average transaction value for transactions that are frequently performed by each entity included in the entities included in the first peer group; and
the first indicator specifies transactions that have a transaction value exceeding the average transaction value for transactions that are frequently performed by each entity included in the first peer group.

5. The method of claim 1, wherein the transaction data for entities included in the first peer group comprises:
historical transactions associated with a particular entity over a particular time period; and
an identification of reoccurring transactions associated with the particular entity over the particular time period.

6. The method of claim 5, wherein the transaction data for entities included in the first peer group further comprises a corpus of documents that are predetermined to satisfy one or more search criteria associated with a negative media search for the particular entity.

7. The method of claim 1, wherein:
the prioritization indicator comprises a score; and
a value of the score represents a number of potentially anomalous transactions included in the transaction data for the target entity.

8. The method of claim 1, wherein:
the transaction data obtained for the target entity comprises a volume of transaction information;
processing the transaction data for the target entity in relation to the transaction data for entities included in the first peer group to determine the first indicator for the target entity comprises processing, by the server system, the volume of transaction information such that the first indicator is determined within a first time period after the transaction data for the entities included in the first peer group is obtained; and
the first time period is shorter than a second time period required to manually process the volume of transaction information to determine the first indicator within the transaction data for the entities included in the first peer group.

9. The method of claim 1, wherein:
the transaction data for entities included in the first peer group is periodically obtained by the server system as transaction data instances that are obtained at specified times; and
the transaction data for entities included in the first peer group is processed by the server system by processing each transaction data instance to determine the first indicator associated with each transaction data instance for entities included in the first peer group.

10. The method of claim 1, wherein training the transaction model to apply the first set of evidence factors to identify the potentially anomalous activity associated with the activity pattern type comprises:
obtaining a training dataset comprising a set of transaction patterns that are predetermined to be associated with potentially anomalous activity;
classifying each of the set of transaction patterns as corresponding to a particular activity pattern type;
selecting, from among the set of transaction patterns, one or more transaction patterns that are classified as corresponding to the activity pattern type; and
training the transaction model to apply the set of first evidence factors based on the one or more transaction patterns that were selected from among the set of transaction patterns.

11. The method of claim 10, wherein after training the transaction model to the apply the first set of evidence factors, the method further comprises:
determining, by the server system, a change to transaction activity patterns associated with the activity pattern type;

selecting, from among the set of transaction patterns, one or more updated transaction patterns that are re-classified as corresponding to the activity pattern based on the change to transaction activity patterns associated with the activity pattern type; and re-training the transaction model to apply the first set of evidence factors based on the one or more updated transaction patterns that were selected from among the set of transaction patterns.

12. The method of claim 1, further comprising:

identifying, by the server system, one or more attributes of the target entity that have changed after the target entity classified to the first peer group of entities and the second group of entities; and adjusting, by the server system, a peer group classification for the target entity based on the one or more attributes of the target entity that have changed after the target entity classified to the first peer group of entities and the second group of entities.

13. The method of claim 12, wherein adjusting the peer group classification for the target entity based on the one or more attributes comprises:

reclassifying the target entity to a third peer group of entities that share a third set of attributes, wherein the third set of attributes includes the one or more attributes of the target entity that have changed after the target entity classified to the first peer group of entities and the second group of entities.

14. The method of claim 1, further comprising:

training, by the server system, a second transaction model to apply a second set of evidence factors to identify potentially anomalous activity associated with a second activity pattern type that is different from the activity pattern type;

classifying, by the server system and based on the set of attributes of the target entity, the target entity to a third peer group of entities that share a third set of attributes;

obtaining, by the server system and from the one or more data sources, transaction data for entities included in the third peer group; selecting, by the server system, the trained second transaction model based on the second set of attributes;

processing, by the server system and using the trained second transaction model, the transaction data for the target entity in relation to the transaction data for entities included in the third peer group to determine a third indicator for the target entity, wherein the third indicator comprises fraudulent transactions; and computing the prioritization indicator comprises computing the prioritization indicator based at least on combining the first indicator, the second indicator, and the third indicator.

15. A system comprising:

one or more computers; and one or more storage devices storing instructions that, when executed by the one or more computers, cause the one or more computers to perform operations comprising:

training, by a server system, at least (i) a transaction model to apply a first set of evidence factors to identify potentially anomalous activity associated with an activity pattern type; classifying, by the server system and based on a set of attributes of a target entity, the target entity as belonging to at least (i) a first peer group of entities that share a first set of attributes and (ii) a second group of entities that share a second set of attributes, wherein the first peer group and the second group comprise at least one unique entity that is only included either the first peer group or the second peer group;

obtaining, by the server system and from one or more data sources, transaction data for the target entity, transaction data for entities included in the first peer group, and transaction data for entities included in the second peer group;

selecting, by the server system, the trained transaction model based on the set of attributes of the target entity;

processing, by the server system and using the trained transaction model, the transaction data for the target entity in relation to the transaction data for entities included in the first peer group to determine a first indicator for the target entity, wherein the first indicator represents a first classification of normalcy relative to transaction data of the first peer group with respect to the activity pattern type given the first set of attributes;

processing, by the server system and using the trained transaction model, the transaction data for the target entity in relation to the transaction data for entities included in the second peer group to determine a second indicator for the target entity, wherein:

the second indicator represents a second classification of normalcy relative to transaction data of the second peer group with respect to the activity pattern type given the second set of attributes, and the second classification of normalcy is different from the first classification of normalcy; determining, by the server system and based on the first indicator, that transaction data for the target entity is potentially anomalous relative to the first classification of normalcy;

determining, by the server system and based on the second indicator, that transaction data for the target entity is not potentially anomalous relative to the second classification of normalcy;

adjusting, by the server system, the activity pattern type based on determining that transaction data for the target entity is (i) potentially anomalous relative to the first classification of normalcy and (ii) is not potentially anomalous relative to the second classification of normalcy;

generating, by the server system, a second set of evidence factors based on adjusting the activity pattern type;

re-training, by the server system, the transaction model to apply the second set of evidence factors to identify potentially anomalous activity associated with the activity pattern type that was adjusted;

computing, by the server system and for the target entity, a prioritization indicator based at least on combining the first indicator and the second indicator, wherein the prioritization indicator is biased towards the first indicator based on transaction data of the target entity being determined to (i) be potentially anomalous relative to the first classification of normalcy and (ii) not be potentially anomalous relative to the second classification of normalcy; and enabling, by the server system, a user to perceive a representation of the priority indicator.

16. The system of claim 15, wherein:

the set of attributes of the target entity comprises an attribute representing a business classification shared by the first set of entities;

the transaction model comprises a machine learning model that is trained to (i) apply the first set of evidence factors corresponding to transactions that are frequently performed by entities of the business classification shared by the entities included in the first peer group, and (ii) identify potentially anomalous transactions that have a likelihood of representing money laundering transactions; and the prioritization indicator computed for the target entity specifies a likelihood that transaction data for the target entity includes transactions identified as potentially representing money laundering transactions.

17. The system of claim 15, wherein:

the first set of attributes associated with entities included in the first peer group comprises an attribute identifying a set of transaction types of transactions that are frequently performed by each entity included in the first peer group; and the first indicator specifies transactions that have a transaction type that is not included in the set of transaction types of transactions that are frequently performed by each entity included in the first peer group.

18. The system of claim 15, wherein:

the first set of attributes comprises an attribute identifying an average transaction value for transactions that are frequently performed by each entity included in the entities included in the first peer group; and the first indicator specifies transactions that have a transaction value exceeding the average transaction value for transactions that are frequently performed by each entity included in the first peer group.

19. A non-transitory computer-readable storage device encoded with computer program instructions that, when executed by one or more computers, cause the one or more computers to perform operations comprising:

training, by a server system, at least (i) a transaction model to apply a first set of evidence factors to identify potentially anomalous activity associated with an activity pattern type;

classifying, by the server system and based on a set of attributes of a target entity, the target entity as belonging to at least (i) a first peer group of entities that share a first set of attributes and (ii) a second group of entities that share a second set of attributes, wherein the first peer group and the second group comprise at least one unique entity that is only included either the first peer group or the second peer group;

obtaining, by the server system and from one or more data sources, transaction data for the target entity, transaction data for entities included in the first peer group, and transaction data for entities included in the second peer group;

selecting, by the server system, the trained transaction model based on the set of attributes of the target entity;

processing, by the server system and using the trained transaction model, the transaction data for the target entity in relation to the transaction data for entities included in the first peer group to determine a first indicator for the target entity, wherein the first indicator represents a first classification of normalcy relative to transaction data of the first peer group with respect to the activity pattern type given the first set of attributes;

processing, by the server system and using the trained transaction model, the transaction data for the target entity in relation to the transaction data for entities included in the second peer group to determine a second indicator for the target entity, wherein:

the second indicator represents a second classification of normalcy relative to transaction data of the second peer group with respect to the activity pattern type given the second set of attributes, and the second classification of normalcy is different from the first classification of normalcy; determining, by the server system and based on the first indicator, that transaction data for the target entity is potentially anomalous relative to the first classification of normalcy;

determining, by the server system and based on the second indicator, that transaction data for the target entity is not potentially anomalous relative to the second classification of normalcy;

adjusting, by the server system, the activity pattern type based on determining that transaction data for the target entity is (i) potentially anomalous relative to the first classification of normalcy and (ii) is not potentially anomalous relative to the second classification of normalcy;

generating, by the server system, a second set of evidence factors based on adjusting the activity pattern type;

re-training, by the server system, the transaction model to apply the second set of evidence factors to identify potentially anomalous activity associated with the activity pattern type that was adjusted;

computing, by the server system and for the target entity, a prioritization indicator based at least on combining the first indicator and the second indicator, wherein the prioritization indicator is biased towards the first indicator based on transaction data of the target entity being determined to (i) be potentially anomalous relative to the first classification of normalcy and (ii) not be potentially anomalous relative to the second classification of normalcy; and enabling, by the server system, a user to perceive a representation of the priority indicator.

20. The device of claim 19, wherein:

the set of attributes of the target entity comprises an attribute representing a business classification shared by the first set of entities;

the transaction model comprises a machine learning model that is trained to (i) apply the first set of evidence factors corresponding to transactions that are frequently performed by entities of the business classification shared by the entities included in the first peer group, and (ii) identify potentially anomalous transactions that have a likelihood of representing money laundering transactions; and the prioritization indicator computed for the target entity specifies a likelihood that transaction data for the target entity includes transactions identified as potentially representing money laundering transactions.

21. The device of claim 19, wherein:

the first set of attributes associated with entities included in the first peer group comprises an attribute identifying a set of transaction types of transactions that are frequently performed by each entity included in the first peer group; and the first indicator specifies transactions that have a transaction type that is not included in the set of transaction types of transactions that are frequently performed by each entity included in the first peer group.

22. The device of claim 19, wherein:

the first set of attributes comprises an attribute identifying an average transaction value for transactions that are frequently performed by each entity included in the entities included in the first peer group; and the first indicator specifies transactions that have a transaction value exceeding the average transaction value for transactions that are frequently performed by each entity included in the first peer group.

23. The device of claim 19, wherein the transaction data for entities included in the first peer group comprises:

historical transactions associated with a particular entity over a particular time period; and an identification of reoccurring transactions associated with the particular entity over the particular time period.

* * * * *